Sept. 3, 1968             E. E. SHELDON             3,400,291
IMAGE INTENSIFYING TUBES PROVIDED WITH AN ARRAY OF
ELECTRON MULTIPLYING MEMBERS
Filed Aug. 28, 1964                           2 Sheets-Sheet 2
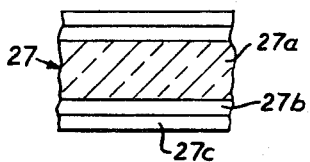
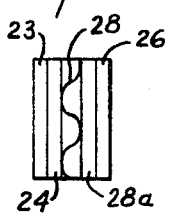
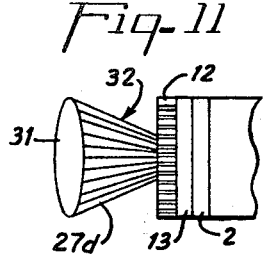
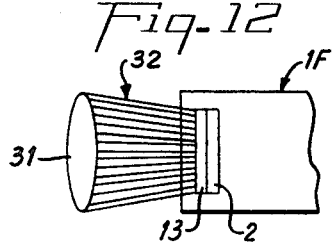
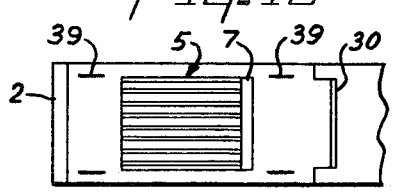
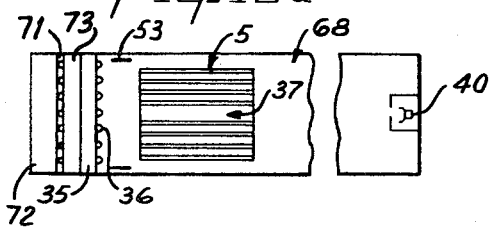
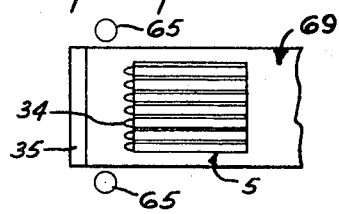
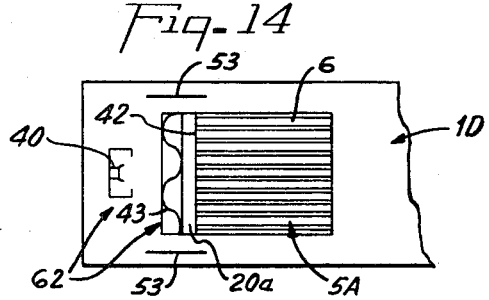
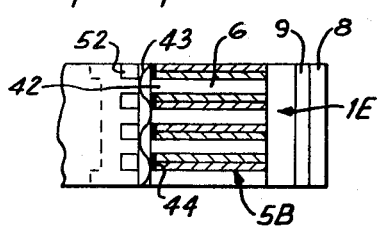
INVENTOR.
EDWARD EMANUEL SHELDON
BY
*L. S. Saulsbury*
ATTORNEY

United States Patent Office 3,400,291
Patented Sept. 3, 1968

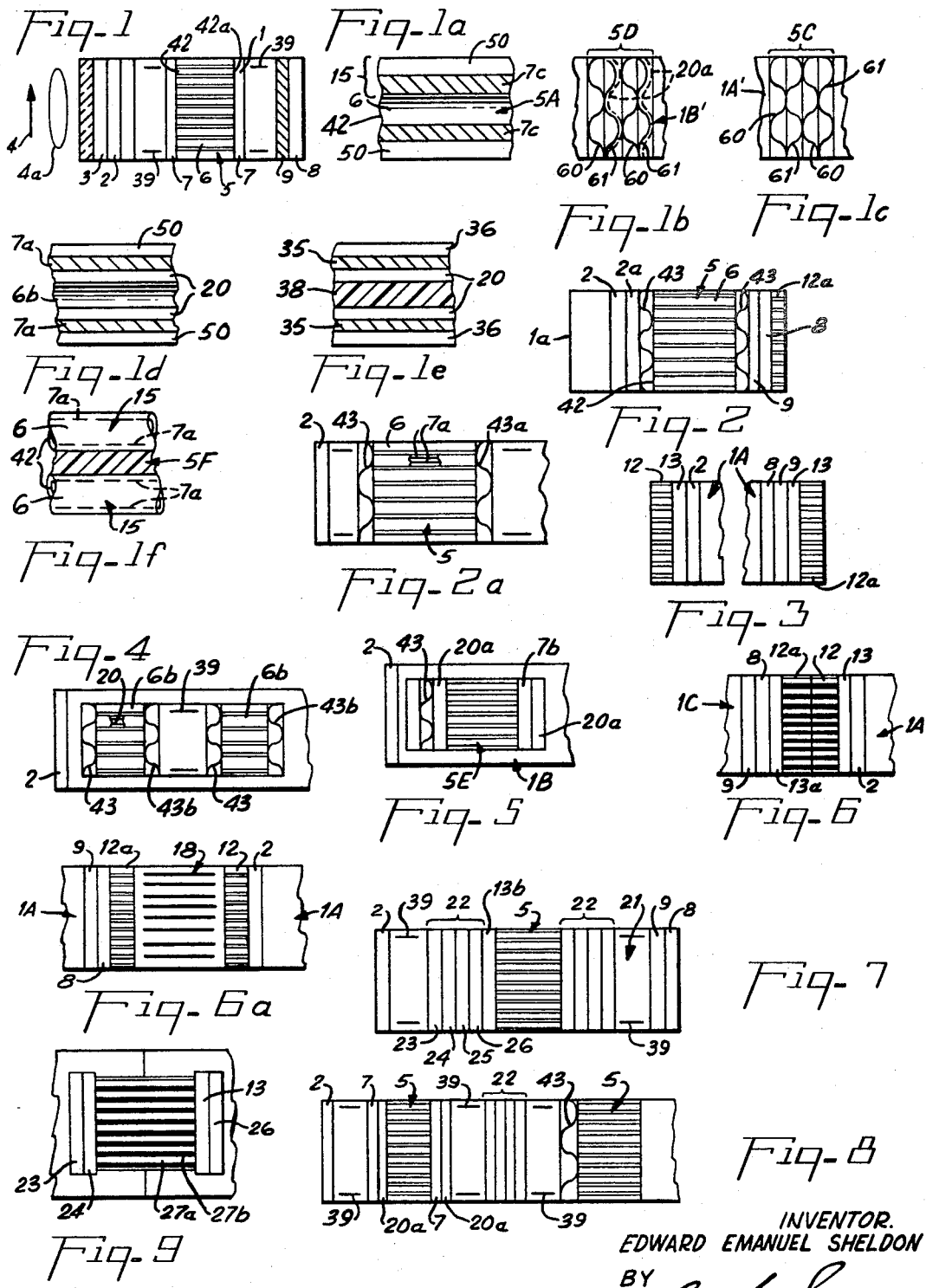

3,400,291
IMAGE INTENSIFYING TUBES PROVIDED WITH AN ARRAY OF ELECTRON MULTIPLYING MEMBERS
Edward Emanuel Sheldon, 30 E. 40th St., New York, N.Y. 10016
Filed Aug. 28, 1964, Ser. No. 392,960
18 Claims. (Cl. 313—65)

ABSTRACT OF THE DISCLOSURE

This invention relates to novel vacuum tubes which serve for producing images and which comprise a two-dimensional array of electron multiplying hollow members containing tunnels which serves to multiply the beam of electrons produced by image reactive electron emitting means and which beam has the pattern of said image. This device is characterized by the use of walls of electron multiplying members containing tunnels which are constructed of a material resistant to the leaching of the core of said members. In addition in some cases the walls are constructed of material which does not deform by the heat of fusion bonding said members into an array and preserves uniformity of the diameters of said tunnels which is essential for definition of images. Another embodiment of said invention is the novel X-ray image intensifying vacuum tube which incorporates said electron multiplying device.

---

This invention relates to the image converters and image intensifiers to be used independently or in combination with television camera tubes, kinescopes for black and white images, and for color images, radar kinescopes, electron mirror tubes, storage tubes, and electron microscopes and has a common subject matter with my U.S. Patent 3,149,258, filed Sept. 9, 1954, and has a common subject matter with my U.S. Patents 2,555,423, filed on Apr. 16, 1947; U.S. 2,586,391, filed July 8, 1947; U.S. 2,593,925, filed Oct. 5, 1948; U.S. 2,877,368, filed Mar. 11, 1954, and U.S. 3,021,834, filed Nov. 28, 1956 and U.S. 3,279,460, filed Dec. 4, 1961.

My invention will be useful in all situations which require the conversion of radiation from one wave-length to another wave-length of spectrum.

My invention will be useful also for intensification of the brightness of the images to be reproduced.

In addition, my invention is of great importance for improvement of resolution of images reproduced.

In addition, my invention will make it possible to miniaturize the present image converters, and image intensifiers, such as are described in my patents, U.S. 2,555,423 and 2,555,424; and which were used successfully in the field of diagnostic radiology.

My invention will be better understood when taken in combination with the accompanying drawings.

In the drawings:
FIGURE 1 shows the novel image intensifier.
FIGURE 1a shows novel electron guide.
FIGURES 1b, 1c, 1d, 1e, and 1f show modification of the electron guide.
FIGURES 2, 2a, 3, 4 and 5 show modifications of the image intensifier.
FIGURES 6 and 6a show the use of two tubes in cooperative relationship.
FIGURES 7 and 8 show cascade image intensifiers.
FIGURES 9, 10 and 10a show a novel composite screen.
FIGURES 11 and 12 show image intensifier provided with a fiber-optic lens.
FIGURE 13 shows a novel television camera tube.
FIGURES 13a, 13b, 13c show novel acoustic image converters.
FIGURE 14 shows a novel electron gun.
FIGURE 15 shows a novel storage tube.

FIGURE 1 shows a novel vacuum tube which comprises a photoemissive photocathode 2 such as of Cs, Na, K with Sb, Bi or As or of a mixture of aforesaid elements, such as K-Cs-Sb or Na-K-Sb. For infra-red radiation Cs-O-Ag or Cs-Na-K-Sb will be more suitable. The photocathode 2 may be deposited on the end-wall of the tube 1 or on a transparent supporting plate such as of quartz, glass or mica 3 or of arsenic trisulfide. The visible or invisible radiation image of the examined object 4 is projected by the optical system 4a on the photocathode 2 and is converted into a beam of photoelectrons, having the pattern of said image. The photoelectron beam has to be focused in order to get a good reproduction of the image. In the devices of the prior art, the focusing was accomplished by electrostatic or electromagnetic lenses which are large and heavy. As a result, the standard image tubes are bulky and cannot be miniaturized. In my device, I eliminated the electrostatic or electromagnetic lenses which made it possible to make a miniature device. The problem of focusing the electron beam without the use of electron-optical devices, was solved by the use of a novel mechanical device such as the apertured guide 5. The guide 5 comprises a plurality of tunnels 6, each tunnel is of a microscopical diameter and extends through the whole length of the guide. Each of the tunnels must be insulated well from the adjacent ones. It was found that there are various ways to construct such guide. In one preferred embodiment the guide 5A may be constructed of a plurality of hollow tubes 15 of glass or of plastic, having their both ends open and being of ten microns diameter or less, and held together by silicone or other temperature stable plastics or by fusing them together by heating, see FIGURE 1a. For a good resolution of the image, I use 150–250,000 of such tubes stacked together in one square inch area. In some cases each of tubes 15 is coated on inside walls with a conducting layer, such as of aluminum, 7a or semiconducting layer 7c, which is connected to an outside source of electrical potential.

The tubes 15 may be also held in position at their ends only either by fusing them at the ends only, by heat, or by gluing them together with silicone or other plastic material compatible with vacuum or mechanically, for example, by threading their ends only into a mesh screen mounted rigidly in the tube.

In cases in which resolution of images is not important, the guide 5 may be constructed of a number of apertured glass plates combined in one unit as was described above for tubes 15. In the preferred embodiment of invention the tubes 15 of glass or plastic may be coated on their outside walls with a conducting material 7a or semiconducting material 7c and next with the insulating material such as of fluorides, glass, plastic, MgO, or silicon oxide 50, extending along the entire length of said tubes and around their entire circumference. Next the inner glass or plastic wall of the tubes 15 is leached out to make the conducting 7a or semiconducting layer or resistive 7c face the lumen of the tunnels 6. In this construction the insulating coating 50 is of material resistant to the leaching agent and it will serve as a support for other layers. The material for uniting the tubes 15 should be resistant to temperature necessary for vacuum processing. Plastic materials such as fluorocarbons, polyethylenes such as fluoroethylenes or silicon compounds such as silicates are useful.

If the tubes 15 are united by heating them, the outer walls of the tubes may be clad before the fusion with a glass or other material which is resistant to the leaching agent and which melts easier than the layer 50. In some cases the dielectric layer 50 may serve for this purpose as well.

In some cases, the first coating to be applied to the walls of the tubes 15 may be of a secondary electron emissive material 20, as shown in FIGURE 1d, which may be of semiconducting type such as CsSb, of insulating type such as of fluorides, MgO, or alkali halides such as KCl or of aluminum oxide, or of conducting type such as Be, Ni, Cu, or of a mixture thereof. In some cases layer 50 and 7a or 7c should be able to tolerate temperature of 600° C. The dielectric layer 50 as was explained above serves as a support for all other layers and extends along the entire length of the tunnels.

The secondary electron emissive layer 20 should preferably extend along the entire length of the tubes and cover the inside lumen of tunnels 6 on all sides.

In some cases the coating 20 may be also applied to the inside walls of the tubes 15, after they have been coated with the conducting and insulating layers and after they were leached as was described above, but the results are inferior than in the method described above.

It is also possible to coat the inside walls of the tubes 15 with a conducting layer and with a secondary electron emissive layer 20 by evaporation or electrolytically. In such case the tubes 15 do not require any leaching at all. The results however are inferior to the method described above because the secondary electron emissive coating is not uniform. In one embodiment of preferred construction of the deposition of the secondary electron emissive material is done on the external surface of the walls of said tubes which makes it practical to produce a homogenous and uniform deposition of the secondary electron emissive material. As was explained above the subsequent leaching of the glass makes the secondary electron emissive material face the lumen of the tunnels 6b.

Another preferable method of building the guide 5 is to use a fiber plate which consists of plurality of fibers of 5 to 10 microns diameter made of glass or plastics.

The fibers are coated with a dielectric material 50 such as a suitable glass, plastic, fluorides, silicon oxide or other silicon compounds, as shown in FIGURE 1f. In some cases the fibers and their coating should be able to tolerate temperature of 600° C.

The material for uniting the fibers should be resistant to leaching agent used for the glass and also resistant to temperature necessary for vacuum processing. Among plastic materials fluorocarbons, polyethylenes such as fluoroethylenes or silicon compounds are the best. All these fibers are glued together chemically or are fused together by heating. Such a fiber plate is now subjected to a leaching process in which the glass or plastic fibers are etched out and dissolved by a suitable chemical. The leaching agent does not attack however, the coating of fibers. We will obtain therefore, after the leaching is completed, a guide 5F having as many tunnels 6 as there were original fibers in the plate. The fiber-plates can be constructed of fibers having only six microns in diameter. Therefore the tunnels 6 will have a diameter of approximately 6 microns. If it is important to have the tunnels of a uniform diameter, the fiber plate should be made of fibers which have a coating of glass or plastic which does not deform during the heating fusion. In some cases it is preferable to have an electrically conducting coating on the inside walls of tunnels 6. In such case, a layer of Al, Pd, Au or Ag may be deposited on the inside walls of the tunnels 6 either by evaporation or electrolytically. A preferred method of providing a conducting 7a or semiconducting or resistive 7c coating inside of tunnels 6 is to use the fiber plate in which the fibers before combining them in one unit are clad with a metallic coating or in which the dielectric coating such as of glass or plastic comprises a metal.

In such case an additional insulating layer 50 which may be of a glass, plastic, fluorides or silicon oxide or silicates should be deposited outside of the metallic layer to provide a good electrical insulation of tunnels 6 from each other. It should be understood that tunnels 6 and all their modifications have the length a few times, which means at least two times, larger than the diameter of their apertures 42.

Also fiber-optic mosaics may be used for construction of the electron guide 5. Such mosaic can be made of a plurality of fibers, having a core of one kind of glass and a coating of another type of glass. All these fibers are fused together by heating. Such a fiber-optic plate is now subjected to a leaching process in which the core of the fibers is etched out and dissolved by a suitable chemical. The leaching agent does not attack however, the coating of fibers. We will obtain therefore, after the leaching is completed, a plate having as many tunnels as there were original fibers in the fiber-optic mosaic. It should be understood that these glass fibers and fibers described above may be also provided with a coating of secondary electron emissive material 20 and of the conducting material 7a before being coated with another type of glass. Therefore after the core of said fibers is leached out the secondary electron emissive layer will face the lumen of tunnels 6.

I found that the tunnels made of the metal tubes in the prior art could not give a good resolution of the images because the metal tubes could not be made of diameter smaller than 0.50 mm. and could not be reproduced uniformly. In my device glass or plastic tubes are used which can be produced of diameter of 0.01 mm. and which can be produced with a great degree of uniformity in great numbers. My device will need 200,000 tubes or more.

It should be understood that the word "glass" in the specification and in the claims embraces all kind of glasses and synthetic plastic materials as well.

Another electron guide is shown in FIGURE 1c. The vacuum tube 1A' has a source of electrons such as photocathode 2 or an electron gun 40 and a novel electron guide 5C.

The guide 5C comprises in vacuum tube 1A' a plurality of performated members 60 such as plates or meshes of dielectric material, such as glass or plastic and a plurality of electrically conducting perforated members 61 such as plates or meshes of steel, nickel or copper. The dielectric members 60 and conducting plates or meshes 61 are stacked together and glued together or fused in an alternating pattern. In this way plural tunnels 6a are produced which have walls of alternating strips of dielectric material and of a conducting material. All electrically conducting members 61 may be connected to an outside source of potential.

An improved method of producing apertured plates or meshes is to use a fine focused electron beam for perforating continuous sheets of suitable materials. This method is used for electrically conducting materials such as nickel, copper beryllium and for dielectric materials such as plastics, fluorides or glass as well.

In some cases it is advantageous to intensify electron beam by a secondary electron multiplication. This is accomplished in my invention by coating the perforated apertured conducting members 61 of the guide 5D in vacuum tube 1B' with a secondary electron emissive material 20a such as calcium fluoride, alkali halides, such as KCl, aluminum oxide, CsSb, and Ni or Be, of the thickness of 50 to 250 Angstroms as shown in FIGURE 1b. This coating 20a may be deposited by evaporation or by electrolytic process, and is deposited before the members 60 and 61 are combined together in one unit, their apertures being aligned and forming thereby elongated tunnels 6a having the length larger than diameter of said apertures. It should be understood that the various arrangements of dielectric members 60 and of conducting members 61 coated with layer 20a come within the scope of my invention. For example, I may use a few dielectric members 60 for each conducting member. The conducting members 61 coated with the layer 20a are connected to an external source of the electrical potential. Each member 61 is provided with a potential a few kv. higher than the preceding one. In the vacuum tubes of the prior art the emitted secondary electrons had to be focused by means of bulky magnetic devices to prevent loss of resolution. In my device, all electron-optical focusing devices can be eliminated and still a better resolution is obtained than in the prior art. The secondary electrons must travel through the tunnels 6a and are restrained to the size of such tunnels. The tunnels 6a or 6 should preferably be in some cases at an angle to the photocathode 2. In some cases the apertures 42 of tunnels 6 or 6a should have a bevelled shape.

It was found however that the perforated plates of meshes whether of conducting type or of dielectric type cannot give as good resolution, as the electron guides made out of hollow tubes or of fibers which were described above. It was also found that conducting mesh screens covered with insulation and stacked together do not make tunnels of uniform diameter and shape as it is required for the best resolution of the images as it is impossible to bring plurality of such screens into a perfect registry with each other as it was successfully done in electron guides using hollow tubes or leached out fiber plates.

My novel imaging devices may use all embodiments of the electron guides described above. The novel image tube 1 shown in FIGURE 1, as described above, has the photocathode 2 on the support 3, electron guide 5 and an image reproducing screen 8. The image reproducing screen 8 comprises luminescent or electroluminescent material such as ZnSCdS, ZnSAg or zinc silicate and is covered on one side with an electron transparent, light reflecting layer 9 such as aluminum. The layer 9 prevents the light emitted by the screen 8 to scatter back to the photocathode 2. The image of the examined area 4 is projected by the lens 4a on the photocathode 2 and is converted into a beam of photoelectrons having the pattern of said image. The photoelectron beam is accelerated by the electrical fields 39, enters the guide 5 through the apertures 42 and is focused by said guide onto luminescent screen 8. It leaves the guide through the apertures 42a, is accelerated again by the fields 39, strikes the screen 8 and reproduces a visible image therein. This novel image tube does not require any electron-optical focusing devices for good resolution of the image.

I found that the closer, the guide 5 is to the photocathode 2, the better is the resolution of the image. In particular, a distance of a small fraction of one millimeter will give the best results, the distance of a few millimeters will give a much worse resolution. The vacuum tube 1 shown in FIGURE 1 must be provided with a unidirectional electrical potential for acceleration of photoelectrons from the photocathode to the guide 5, and from the guide 5 to the image reproducing screen 8. The accelerating potential may be applied to the conducting cylinders which transmit electrons or coating 39 on the inside of the tube envelope or to the conducting layer 7 such as of aluminum. The higher the accelerating potential is, the brighter the reproduced image will be in the screen 8. There is, however a limit to the strength of the accelerating potential which is set by the dielectric strength of the tube. The use of guide 5 allows the potential to be spread between the photocathode 2 and screen 8 over a longer distance and without loss of resolution. Therefore it will be possible now to use, in the tube 1, a much higher potential than it would be feasible without said guide 5. The conducting layer 7 may be 50–100 A. thin so it will be completely transparent to the photoelectrons emitted by the photocathode 2. The conducting layer 7 or semiconducting layer 7c is connected to an outside source of potential and may be preferably in contact with the conducting or semiconducting coating on inner walls of tunnels 6. The layer 7 may be continuous. In some cases, a perforated metallic layer 7b will be better. The perforations in the layer 7 corresponding to the apertures 42 of the tunnels 6, may be made by blowing a strong current of air through the tunnels 6. Another method of producing the apertured conducting member is to use a perforated plate or mesh screen of conducting material such as 43 described below.

The length of the tunnels 6 in the guide 5 must be longer than the diameter of the apertures 42 of said tunnels. The actual length will vary according to the application of my guide and the type of vacuum tube. However the tunnels of the guide should be at least a few times longer than the diameter of the apertures. The longer is the guide 5, the greater difference of potential can be applied to both sides of said guide. The greater is the potential difference, the more acceleration of the electrons can be achieved. This brings about a greater image intensification, which was one of the purposes of my invention. The acceleration potentials may be supplied from an external source of potential connected to the layer 7 or 43 or to seperate grids which transmit electrons and are disposed on both sides of the guide 5, or to conductive rings 39 mounted on the walls of the vacuum tube. In the devices of the prior art, it was impossible to provide a large potential difference, because the separation of the fluorescent screen 8 from the photoelectric screen 2 could not be longer than 0.25–0.5 cm.; exceeding this distance caused a prohibitive loss of resolution of the image. In my device, in spite of the elimination of the focusing electron-optical lenses or fields, I can provide separation of the photocathode 2 and of the fluorescent screen 8 of any desired length without a loss of resolution of the image. I found that for the best resolution in this embodiment of invention the walls of the tunnels 6 facing the lumen of said tunnels should be free from a photoelectric material or from a secondary electron emissive material.

The electron beam from the photocathode 2 carrying the image is therefore guided by the electron guide 5 to the image reproducing screen 8. It is accelerated to impinge on said screen 8 with a sufficient velocity to produce therein a visible image of increased brightness.

The tunnels 6 may be uniform in their diameter through the whole length of the guide 5. The tunnels 6 may have also a divergent form, in which the exit apertures are larger than the entrance apertures. In such case the electron beam will be enlarged upon its exit from the guide. The tunnels 6 may be also of a convergent form in which the exit apertures are smaller than the entrance. In this case the electron beam will be demagnified on its exit from the guide.

The separation of guide 5 from the photocathode 2 will cause some photoelectrons to strike the solid parts of guide 5, instead of entering the apertures 42 in the guide. In this way, a space charge may be produced on solid parts of guide 5, which may interfere with the photoelectron image. I found that development of the space charge is the cause of failure of such devices. The conducting layer 7 will prevent this from happening as the charges will be able to leak away through layer 7. In some cases, it is preferable to mount guide 5 in contact with the photocathode 2 or the photocathode may be deposited directly on the end-face of guide 5 instead of on the end-wall of the tube or on a supporting member 3, as is shown in FIGURE 2. In this construction the conducting layer should be a perforated layer 7b or a perforated member 43. The discontinuous electrically conducting layer 7b may be also made by evaporation and will have 80–90% transmission for electrons. In some cases it is preferable to use an electrically conducting member 43 in the form of a metallic wide mesh screen or perforated plate of metallic material or of a perforated member coated with an electrically conducting material such as tin oxide. The member 43 is mounted on the end-face of the guide 5 in such a manner that openings of the screen or plate 43 coincide with one or with a few apertures 42 of the guide 5. The screen or mesh 43 is connected to an outside source of electrical potential in the same manner as layer 7b. In this construction I found that a problem arises because of the chemical interaction between the photoemissive material of photocathode 2 and the materials of guide 5. It is important, therefore to select materials which do not poison the photocathode. Lanthanum glass is chemically compatible. Still a protecting separating layer 2a of a light transparent material such as of calcium fluoride MgO, or of silicon monoxide may be needed. The layer 2a should be preferably perforated and have a transmission for photoelectrons of 80%–90%. The apertures of the layer 2a must coincide with the apertures 42 of the guide. The layer 2a may be prepared by deposition on the top of the layer 43 of a continuous layer first and next by rupturing said layer with a strong current or air blown through tunnels 6, so that only the parts overlaying the solid portions of the guide will remain in position.

Also, the phosphor screen 8 may be deposited directly on the end-face of guide 5. This construction facilitates markedly the construction of tube 1, as guide 5 with the image reproducing screen 8, and in some cases also with the photocathode 2 may be prepared outside of vacuum tube 1, and then introduced into tube 1a in one unit, and mounted therein.

In some cases, either only the photocathode 2 or only the image screen 8 are in contact with the guide 5. In case the screen 8 is separated from the guide 5, the separation, for the best results, should be preferably a fraction of one millimeter.

In some cases it is preferable to prevent the electrons which travel through the tunnels 6 or 6a in the guide 5 from striking the walls of said tunnels. This can be accomplished by providing the walls of said tunnels which face the lumen with a conducting or semiconducting coating 7c as shown in FIGURE 2a. The conducting coating may be of aluminum or chromium. The semiconducting coating may be of tin oxide or of titanium oxide. The coating 7a may be connected to the perforated conducting member 43 or to layer 7 which again may be connected to an outside source of electrical potential. As all tunnels 6 are in contact with the layer 7 or with member 43, walls of said tunnels will have a potential which will repel electrons travelling through said tunnels.

In some cases, the second perforated member 43 or 7 mounted on the opposite end of the guide 5, may be discontinuous from the coating 7a by terminating said coating 7a before reaching one end-face of the guide 5. In this construction, the second member 43 may be connected to the external source of electrical potential to provide acceleration for electrons.

In the embodiment of invention, shown in FIGURES 1 and 2, and 2a, the tunnels 6 of the guide 5 run normally to the photocathode 2 and are straight from the beginning to their end to prevent photoelectrons from striking the inside walls of the tunnels.

It will be understood that my device may use a plurality of electron guides 5. In such case electron accelerating means such as grids, rings, cylinders or meshes connected to a suitable source of potential may be interposed between the electron guides.

The semiconducting coating or resistive 7c in some cases is preferable to conducting coating because it allows to establish potential gradient along the length of the tunnels 6. This potential gradient will cause acceleration of electrons into direction of the exit apertures 43a if it is connected to a suitable source of electrical potential.

In many cases its is advantageous to intensify electron beam by a secondary electron multiplication, e.g., by coating the inner walls of the tunnels 6a with a secondary electron emissive material 20 such as CsSb, Ni, Be, calcium fluoride, alkali halides such as KCl or aluminum oxide or others. This coating 20 may be deposited by evaporation into tunnels 6, but the deposition is not uniform for the best results. In a preferable modification of this invention the secondary electron emissive coating 20 for the inner walls of the tunnels 6 may be provided by the methods which were described above. The glass or plastic fibers 38 before being fused or glued into a fiber plate are coated with a secondary electron emissive material 20, such as was described above. On the top of said coating 20 an electrically conducting coating 35 is applied such as of chromium, aluminum or nickel. On the top of the conducting coating 35, a dielectric coating 36 such as of glass, plastic or of fluorides is applied, which will serve to fuse all fibers into one fiber plate as shown in FIGURE 1e. It should be understood that the coatings 20, 35 and 36 must be of material resistant to the action of the chemicals used for etching out the fibers. After the fiber plate is prepared, and the fibers are leached out, we obtain the tunnels which have the following layers. The layer facing the lumen of said tunnels is the secondary electron emissive layer 20, the next layer is the electrically conducting layer 35, the next layer is the insulating layer 36. The conducting layer 35 may be connected to the source of suitable potential for the best secondary electron emission.

In some cases, instead of conducting layer on the inside walls of the tunnels 6 it is better to have a layer of semiconducting material 7c such as of tin oxide, titanium oxide, or zinc fluoride. It should be understood that the use of semiconducting coating instead of a conducting coating applies to all modifications. In some cases an electrically resistive evaporated layer 7c may be used instead of a semiconducting layer 7c. The resistive layer in a modification of my invention, instead of being a base for the electron emissive layer 20, may replace it and serve to provide electron multiplication. In this construction the tunnels 6 should be at an angle to the photocathode or the photocathode at an angle to the tunnels.

The operation of the modification of my invention using secondary electron emissive layer 20 is shown in FIGURE 4. The photoelectrons entering the apertures 42 are directed into said apertures at an angle so that they will impinge on the walls of said tunnels 6 coated with layer 20. In this construction apertures 42 are slanted at an angle of 45–55° and tunnels 6b in the guide 5 are straight or at an angle in relation to the photocathode 2. In some cases in order to provide the obliquity for the entering photoelectrons, instead of the tunnels, the photocathode 2 may be mounted at the angle. In such a case the tunnels will be normal in relation to the end-wall of the tube. The angle at which photoelectrons enter will depend on the size of apertures and their spacing from the photocathode. The photoelectrons must have only a few hundred volt velocity to produce secondary electron emission greater than unity from the layer 20. The low accelerating voltage in front of the photocathode 2 creates the problem of resolution. As was explained above, my device is characterized by the absence of electron-optical focusing means. The photoelectrons leaving the photocathodes have a range of velocities 0.5 volt–10 volts according to the wavelength of radiation used. The use of 300 to 1,000 volt accelerating potential requires a much closer spacing of the photocathode 2 to the end-face of the guide 5 than devices in which the accelerating potential is a few thousand volts. It was also found that the use of the low accelerating voltage required that the conducting layer 7 be of perforated type such as layer 7b or a perforated member 43 because electrons of a low velocity will not be able to penetrate continuous layer 7.

The inside walls of the tunnel 6 should have a progressively higher potential along their length in order to cause repeated impingement of secondary electrons on the layer 20 while they are traveling to the exit apertures. It was found that the best way to provide progressively higher potential for the walls of the tunnel 6 is to divide the electron guide 5 into plural segments and to interpose between said segments apertured electrically conducting members 43 or apertured layer 7b or conducting rings which can be connnected to various electrical potentials required. The conducting layer 7a or semiconducting layer 7c which are on each tunnel are connected to said apertured electrically conducting members. This construction affords a simple and practical solution of supplying progressively high potential to all tunnels 6 in spite of the fact that we may use 200,000 tunnels or more in one electron guide 5.

I also found that devices of the prior art failed because of impossibility of obtaining an exact registry of the apertures of the end-face of one electron guide 5 or one segment of the electron guide with the apertures of the next electron guide, when many guides are mounted in the tube separately and spaced apart. I found that the best registry was obtained when the electron guide 5 described above was cut into plural segments to produce plural guides and the conducting apertured member 43 was inserted between the segments of said guide in a proper spacing from them and then all parts were fixed into one rigid unit, either mechanically or chemically or by heating. In some cases the conducting apertured members are mounted only on end-faces of the segments of the electron guide and are not between them in a spaced position.

The registry of apertures of successive guides I found to be the main problem for good definition of images. The best method to accomplish a good registry is as follows. An electron guide of one of types described above is mounted on a support which has a few compartments which can be moved apart in one plane only. The electron guide 5 is cut to provide two or more smaller electron guides. The movable parts of the support are moved apart to separate these segments of the electron guide. This provides the space for the mounting of the electronically conducting member 43 such as was described above. At the same time it prevents displacement of the segments of the electron guide in relation to each other in any other plane. The electrically conducting members 43 are mounted either on the end-face of the segments of the electron guide, or are mounted between the end-faces of said segments. Next the movable parts of the support are moved back. This brings the segments of the electron guide into a close spacing to each other. In some cases an insulating spacer in the form of mica ring may be interposed between two end-faces of the adjacent segments of the electron guide. This will be useful when the apertured conducting members 43 or 7b are mounted between the end-faces of the segments of the electron guides. Next the segments of the electron guide with the electrically conducting members 43 are fixed into one rigid unit. In this way a perfect registry of apertures of plurality of electron guides is obtained, which could not be accomplished in the prior art. The above described units comprising plurality of electron guides can be mounted in the vacuum tube without any damage to the registry of the apertures.

The plural segments can be united either by chemical means such as by a plastic compatible with vacuum tube processing such as silicones, or fluorocarbons or polyethylenes. The segments can be also joined in one unit with mechanical means, or by the embedding material or by heating and fusing them.

It was found that a part of the photoelectrons does not enter into apertures 42 but strikes instead the solid parts of the guide 5. As the photoelectrons have velocity at which secondary electron emission is higher than unity a positive charge will develop around the apertures 42. I found that this charge reduces considerably the sensitivity of my device. This charge may be removed by mounting on the end-face of the guide 5 a perforated electrically conducting member 43 in such a manner that its apertures overlie the apertures 42 of the guide. Also perforated layer 7b may be used for this purpose.

The members 43 of layer 7b are connected to a suitable source of potential and will be able therefore to remove the space charge. It was found that a continuous electrically conducting layer 7 could not be used in this device because the velocity of electrons was not sufficient to penetrate through it. The electrons make the exit through the apertures at the end of the electron guide 5. They are accelerated to a high velocity and strike the image reproducing screen 8 through the layer 9. It should be understood that the multiplied electron beam after its exit from the guide 5 may be also used in combination with other devices such as targets of television tubes, storage tubes, and other vacuum tubes.

My construction will therefore produce a device which in spite of its small size is capable of a high image resolution. In addition my device will be very rugged mechanically. In addition my device will reduce the field emission in the vacuum tubes arising from the spreading of caesium vapors.

In another modification of my invention using secondary electron emission for intensification of the images the secondary electron emissive layer 20a is used on the end-face of the guide 5 as it is shown in FIGURE 5. It is preferable to deposit first layer 20a whether it be in the form of a continuous layer or in the form of a discontinuous layer and then to mount on it electrically conducting member 7 or 43 which are transmitting to electrons as shown in FIGURE 5. In some cases the sequence of the layers 20a and of the member 43 may be reversed and the member 43 is the first one to be mounted on the end-face of the guide. The secondary electron emissive layer 20a in this embodiment of invention may be deposited as a continuous layer or as a discontinuous layer which covers essentially only the apertures 42 and the edges around them. It should be understood that in cases in which the fragility of this device is not critical the layer 20a and the member 43 supporting it may be mounted spaced apart from the end-face of the guide 5E. They must be however very closely spaced in relation to said end-face so that the secondary electrons will enter the apertures 42 without causing loss of resolution. The spacing smaller than 0.1 cm. will be necessary for a good resolution.

The secondary electron emissive members 20a are as thin as 50–250 angstroms so that they will emit secondary electrons in forward direction when impinged by primary electrons of sufficient velocity which may be a few kv. The secondary electron emissive member 20a may be of a conducting material such as copper, beryllium or nickel and they may be connected directly to the source of potential. The same is true about members 20a of semiconducting materials such as caesium-antimony. If however the secondary electron emissive material is of dielectric type such as fluorides of calcium or magnesium aluminum oxide, or alkali halides, such as KCl, a conducting layer continuous or apertured should be provided as the base for said electron emissive member 20a. It was found that the use of dielectric type of secondary electron emissive member gives superior results to the devices which use a conducting type of secondary electron emitter.

It was found that in the device described above serious difficulties arise because of the development of space charges. The velocity of photoelectrons for the best operation of the layer 20a should be a few kv. The photoelectrons of this energy striking the solid parts of the electron guide 5 will cause secondary electron emission smaller than unity. As a result a negative charge will develop and the solid parts of the guide 5 around the apertures 42 and will cause various complications in the operation of the device. It was found that this negative charge may be removed by using a continuous type of electrically conducting layer 7 which is connected to a suitable source of potential, in preference to the use of the perforated layer 7b or of the member 43.

The guide 5E in this embodiment of invention has tunnels 6 normal to the photocathode 2, the tunnels 6 have no coating 20 of secondary electron emissive material or of a photoelectron material, as it was described above and shown in FIGURE 1.

It should be understood that the guide 5E may comprise a plurality of short guides, combined in one unit by mechanical means, chemical means, or by heating. Each of short guides is provided with the conducting layers 7, 7b or 43, and has the secondary electron emissive layer 20a on one or both end-faces.

It should be understood that the guide 5 may be sliced into many separate segments, and the secondary electron emissive screens described above may be interposed between the segments of the guide. Next all these parts may be combined in one unit, either mechanically or chemically or by heating. In this way cascade intensification of the electron beam by electron multiplication is obtained without any loss of resolution in spite of the absence of electron-optical focusing devices.

It should be understood that the segments of the electron guide 5 provided on end-faces with the layer 20a should be spaced apart to provide sufficient separation for the use of a high accelerating voltage applied in this device. This spacing should preferably not exceed 0.5 cm. to preserve a good definition.

The rest of the operation of the vacuum tube 1B is the same as of the vacuum tube 1. The great advantage of this novel construction resides in ruggedness of this device.

It should be understood that the novel electron guide 5E may be used also in various vacuum tubes such as television camera tubes, storage tubes, kinescopes, etc.

In the devices of the prior art the mesh screens coated with secondary electron emissive layer were necessarily very fragile, because of their thinness. In my device the layer 20a and member 43 or 7 are being deposited on the end face of the guide have mechanical strength which allows the use in all operating conditions. Another novelty of my device resides in the elimination of electron-optical focusing devices and without loss of resolution.

In some cases the end-walls of vacuum tube 1 or 1A or 1B should be made of fiber-optic plates 12 and 12a as shown in FIGURE 3. It should be understood that this construction applies to all vacuum tubes described in this disclosure. The fiber-optic plates comprise a plurality of light conducting fibers. Each of said fibers consists of a core of material having a high index of refraction such as suitable glass, e.g., flint glass, or quartz or arsenic trisulfide or plastics such as acrylic plastics such as Lucite or polystyrenes.

The light conducting fibers should be polished on their external surface very exactly. Each of them must also be coated with a very thin light opaque layer to prevent spreading of light from one fiber to another. I found that without said light-impervious coating, the image will be destroyed by leakage of light from one fiber to another. The light opaque layer should have a lower index of refraction than the light conducting fiber itself. Such a coating may have a thickness of only a few microns. The light opaque coating may be of materials such as aluminum, a suitable glass or plastic. In some cases it is preferable to use glass or ceramics which will tolerate a high temperature such as of at least 600° C.

Especially glass or plastic of a lower index of refraction than the fibers and containing aluminum or chromium diffused into them are suitable materials for the coating.

In another modification the light opaque layer such as of chromium or aluminum is deposited on the outside of the coating which in such a case may be of a transparent glass or plastic.

All said fibers are glued together with silicones or are fused together by heating them to form a vacuum tight unit. In the use of such fiber-optic plates, care must be exercised to prevent the chemical interaction between the photocathode 2 and the fiber-optic end-wall 12 or 12a.

I discovered that the contact of the end-face 12 or 12a with the photocathode 2 of alkali-antimony type caused an unexpected deterioration of said photocathode. I believe that this effect is due to the presence of boric oxide or lead oxide which are common ingredients in glasses which have a high refraction index. It was found that the best way to prevent this poisoning of the photoemissive photocathode was to provide a thin light transparent member 13 between the end-wall of the tube and the photoemissive layer as shown in FIGURE 3. The light transparent separating layer 13 may be of $Al_2O_3$, fluorides, MgO or silicon oxide and it may be of the thickness of a few millimicrons. It is important that layer 13 of $Al_2O_3$ or other layer used should be of continuous, nonporous type to prevent exchange of ions through said layer. Also same results may be obtained by using a conducting light transparent layer such as of iridium, palladium, or tungsten of similar thickness. In some cases for the best results we may use a combination of a dielectric layer 13 such as of $Al_2O_3$ layer with a light transparent conducting layer.

I also found that the end-face 12 or 12a must be very smooth to prevent nonuniformity of the photoemissive layer or of photoconductive layer which are deposited thereon. Otherwise false potential gradients will be produced which will affect the definition of the image.

Another important feature of the construction of my device is the provision for protecting the vacuum of the tube 1A or 1C.

It was also found that the caesium of the photocathode 2 causes discoloration of the fiber-optic plates 12 or 12a, especially if they contain lead. The protecting layer 13 will prevent this complication.

The fibers of the fiber plates 12 or 12a when subject to the ionizing radiations, were found to discolor which caused losses of transmitted light. The addition of cerium to the glass used for making fibers prevented this complication.

As the fibers have a high index of refraction and alkali-antimony photocathode has a still higher index of refraction it is advisable to interpose between the end-face 12 or 12a and the photocathode 2 a light transparent layer of the thickness of the order of odd number of quarters of wavelength of the light conducted by such fibers and having an index of refraction $n=\sqrt{n_1 n_2}$. In this equation $n_1$ is the index of refraction of fibers and $n_2$ is the index of refraction of alkali-antimony photocathode. This layer 13a may also serve as a protecting layer 13 if it is nonporous.

Another embodiment of the device for intensification of images, is shown in FIGURE 6. Two or more vacuum tubes 1, 1A or 1B and 1C provided with fiber-optic end-walls are brought into apposition to each other and are cemented together. The luminescent image from the screen 8 is transferred by the fiber-optic end-wall 12A and 12 to the photocathode 2 of the next tube without a marked loss of resolution.

A modification of this construction is shown in FIGURE 6a. Two vacuum tubes 1A are connected by means of a bundle of fibers 18 attached to the end-walls 12A and 12. The bundle of coated fibers which were described above serves to conduct images by internal reflection of light. The bundle 18 may be flexible or may be rigid. The bundle 18 may be attached to the end-walls 12 and 12A by any mechanical means or may be separated from the end-walls of the tube. In the latter case, an optical system must be interposed between the end-faces of the bundle and the end-walls of the tube.

Another embodiment of my invention is shown in FIGURE 7. The tube 21 is provided with composite screens or intensifying "sandwiches" 22, which comprise the following layers; a light reflecting electron transparent layer 23, such as of aluminum or titanium, a luminescent layer 24 such as of zinc cadmium sulphide or zinc silver sulphide, a light transparent separating layer 25 which may be of mica, glass, a suitable plastic such as silicone or polyester, alone or in combination with a layer of aluminum oxide, silicon monoxide or other silicon compounds and of the photoemissive layer 26 which may be of any materials described above for the photoemissive layer 2. These composite screens are described in detail in my U.S. Patents 2,555,423, 2,593,925 and 2,690,516. The intensifying screens are deposited on the end-faces of the guide 5. They may be also mounted in apposition to the end-face of the guide 5 and will then form a separate unit. In such a case, they will be supported by the light transparent separating layer, which in this modification will be of glass or mica or of a mesh screen covered with a plastic and $Al_2O_3$ or SiO. It should be understood that the intensifying screen 22 may be also mounted in separation from the end-faces of the guide 5. In such a case, the distance of separation will be governed by the same rules as described above.

In case the screen 22 is deposited on the end-face of the guide, the separating light transparent layer 25 may be preferably of silicone or polyester in combination with a thin layer of aluminum oxide, magnesium oxide or silicon monoxide or other silicon compounds.

The contact of the photo-emissive layer 26 with the end-face of the guide 5 may cause chemical poisoning of the layer 26 and discoloration of the glass. In such case the perforated layer of materials described above for the protecting layer 13 must be interposed between the layer 26 and the end-face of the guide 5. The perforated protecting layer 13b must be mounted in such a manner that its apertures will coincide with the apertures 42.

The photoelectrons from the photocathode 2 impinging on the composite screen 22 will give 10–20 more of new photoelectrons according to the accelerating voltage used.

It should be understood that a few guides 5 provided with the intensifying screens 22 may be mounted in the same tube for a cascade intensification of images. It should be understood that the rest of the operation of the vacuum tube 21 is the same as was described above.

A modification of the invention is shown in FIGURE 8. In this construction, the composite screen 22 is disposed between two guides 5. The composite screen 22 may be separated from the end-face of the guide 5 in which case, the light transparent separation layer 25 of glass or mica or of a mesh screen covered by a plastic and $Al_2O_3$ or SiO will serve as a support. The composite screen 22 may be brought in contact with the end-faces of one or both guides 5. The composite screen 22 may be deposited on the end-face of guides 5 as one unit. It is an important feature of my invention that some layers of the composite screen 22 may be deposited on the end-face of one guide 5 and other layers of the screen 22 may be deposited on the end-face of the next guide, and then both guides may be brought into apposition together. A good combination is to deposit the layers 23, 24 and 25 on one guide 5 and the layer 26 on the end-face of the other guide 5. Many variations of such splitting of the composite screen 22 are feasible and it should be understood that all of them come into the scope of my invention.

It should be also understood that secondary electron emissive layers 20a can be used in combination with the composite screens 22 as shown in FIGURE 8.

It should be also understood that composite screens 22 may be used on both sides of each guide 5, either in apposition or in deposition or in separation from said guide as it was described above.

If the screen 22 is brought into apposition with the guide 5 or if the photoemissive layer 26 is in contact with the end-face of the guide 5 it is important to prevent chemical interaction between the photoemissive material and the materials present in the end-face of the guide 5. This can be accomplished by the depositing on the solid parts 44 of the end-face of the guide a very thin protecting layer of a plastic, such as silicone or a polyester, or of a glass such as lime glass or borosilicate glass or aluminum oxide or silicon oxide, or a fluoride or a combination of a few of these materials in the form of superimposed layers of aforesaid materials. These protecting layers 13b should be preferably apertured and deposited so as not to obstruct the apertures 42 of the guide. The conducting perforated member 7a or 43 may be deposited on either side of the protecting layers and will be connected to an external source of electrical potential.

It should be understood that the guide 5 may be sliced into many separate segments, and the screens 22 may be interposed between the segments of the guide. Next all these parts may be combined in one unit, either mechanically or chemically or by heating. This construction will provide cascade intensification of the images. The protection of the photoemissive layer 26 from interaction with the materials of the end-face of the guide 5 will be the same as was described above.

It should be understood the composite screens 22 may be used in combination ith all types of the electron guide described in this specification and may serve in all types of vacuum tubes.

In case the intensifying screen 22 is not supported by the guide 5, the construction described above, may be preferably modified in the way shown in FIGURE 9 and FIGURE 10. The supporting layer 25 in this construction is replaced by a short bundle of light conducting fibers 27 which were described above. Each fiber comprises a core of transparent glass or plastic 27a of a material, having a high index of refraction and a coating 27b of a material having a lower index of refraction than said core 27a such as of a glass or plastic or of a metal such as aluminum. The coating 27b is light opaque to prevent the escape of light and loss of contrast as was explained above. Sometimes an additional layer 27c of a light opaque metal such as of aluminum is deposited on the layer 27b or a metal such as Al or Cr is diffused into the coating 27b. All fibers are fused together at their end only or along their entire length by heating them or by gluing them into one unit. The other layers of the composite screen such as layers 23, 24 and 26 are mounted on the respective end-faces of the fiber bundle 27. This construction offers a much greater ruggedness than the previously described screens 22 and without loss of resolution.

The photoemissive layer 26 has to be protected from the interaction with the materials in the bundle of fibers 27 in the same way as was explained above, by layer 13.

Another way to make the composite screen 22 rugged without sacrificing resolution or contrast of images is shown in FIGURE 10a. In this construction, the supporting layer 25 of the screen 22, is replaced by a wide mesh screen 28 which is coated on each side or on one side only with a layer of silicone 28a or of polyester or of other light transparent heat resistant, low-vapor plastic. On one side, of the layer 28a, there is deposited in addition, a light transparent, very thin layer of aluminum oxide, magnesium oxide or silicon oxide or other silicon compounds. It should be understood that the construction of the composite screen 22 described in FIGURE 10 or 10a applies to all embodiments of my invention in which such a screen is used.

Another great advantage of my invention resides in the possibility of preparing the luminescent screen 8 and the photoemissive layer 2 in a close spacing to each other, without the danger of contamination of the luminescent material of the screen 8 by caesium or other vapors which has not been possible in the prior art. In my device, the photoemissive layer 2 and screen 8 are separated by the guide 5 which prevents the spreading of Cs to the screen 8. If a perforated type of layer 7 is used, the apertures of channels 6 may be closed by a layer of nitrocellulose or of other material which will be removed by the baking processing of the vacuum tube.

When a plurality of guides 5 with intensifying screens 22 or 7a–20a are used, it may be advantageous to process the guide 5 with the screens attached to it outside of the vacuum tube in a demountable extension of said tube. After completion, the guide 5 with screens 22 is introduced into the final vacuum tube and is mounted there by mechanical means.

The sensitivity of my imaging devices described above may be further increased by using a novel optical objective for focusing the image on the photocathode 2 which is a combination of a lens 31 with a tapered light conducing fiber bundle 32, instead of using the lens alone, as shown in FIGURE 11. The fiber bundle 32 may be attached to the fiber-optic end-wall 12 of the vacuum tubes carrying the photocathode 2, which were described above, by any mechanical means. The fiber bundle 32 comprises a plurality of tapered fibers 27d for the demagnifying of the image produced by the lens.

Each fiber comprises a core of transparent glass or plastic 27a of a material, having a high index of refraction and a coating 27b and of a lower index of refraction than said core 27a of materials such as of a glass or plastic or of a metal such as aluminum. In some cases it is preferable to use glass or ceramics which will tolerate a high temperature such as at least 600° C. In some cases the coating 27b is preferably light opaque to prevent the escape of light and loss of contrast, or an additional layer 27c of a light opaque metal such as of aluminum is deposited on the layer 27b or a metal such as Al or Cr is diffused into the coating 27b to render it light opaque as was described above. All fibers are fixed together at their ends only or along their entire length by heating them or by gluing them chemically into one unit. If the fiber bundle should be flexible, then only the ends of the bundle should be fixed together. If a rigid bundle is wanted, then the fibers are fixed together along their entire length.

In modification of this invention, the fiber bundle 32 may enter the vacuum tube 1F and form a part of its end-wall which in this case, does not have to be made of fiber-optic plate, but may be of the usual glass or metal, construction. The fiber bundle 32 will therefore form a part of the end-wall of the tube or it may replace the whole end-wall. The photocathode 2 is then deposited on the end-face of the bundle 32. As it was described above, precautions must be taken to prevent chemical interaction between the fibers of the bundle and the photoemissive layer 2. A very thin light transparent separating layer 13 should therefore be interposed between the end-face of the bundle 32 and the photoemissive layer 2. The layer 13 may be of aluminum oxide, magnesium oxide or other silicon compounds.

Another modification of my invention which is shown in FIGURE 13 will be of a great importance for television pick-up tubes which have an image section such as image orthicon or image vidicon. My device will permit elimination of electrostatic or electromagnetic focusing devices in the image section used in the present television tubes. In this construction, the photoelectrons from the photocathode 2 of the image orthicon, or other television pick-up tube, are guided to the target 30 by the guide 5. The electrons transmitted through the guide reach the target 30 which is closely spaced to said guide without loss of resolution.

It was also found that the perforated mesh screen used to collect secondary electrons degrades resolution in television camera tubes. In my invention it may be replaced by a continuous conducting layer 7 which is mounted on or adjacent to the end-face of the guide 5 close to the target 30 instead of a mesh screen. The electrons from the photocathode 2 focused by the guide 5 have velocity high enough to pass through the layer 7 which is made very thin to be transparent to electrons, and to impinge on target 30. The secondary electrons from the target 30 are collected by the layer 7.

My invention can also be used for images of invisible radiations such as X-rays, infra-red, or images of atomic particles such as neutrons or electrons or for images formed by supersonic waves. In such case, the photocathode 2 must be modified, to make it responsive to the radiation used for image forming purposes. The photocathode for X-rays or atomic images were described in my Patents 2,555,423 and 2,690,516. The photocathodes described in the above patents, may be modified by using a fiber-optic bundle 27 instead of a light transparent separating layer, as it is shown in FIGURE 9, or by a screen shown in FIGURE 10a.

The photocathode for supersonic images will comprise a piezoelectric plate 35 covered by a continous or mosaic layer 34 of a photoemissive material such as was described above for the layer 2, as shown in FIGURE 13c. The layer 34 is irradiated uniformly by a source of light 65 causing emission of a beam of photoelectrons. The supersonic image is converted by piezoelectric layer 35 into a pattern of potentials corresponding to said image. This voltaic or charge pattern modulates the emission of photoelectrons from the layer 34 or of secondary electrons from the layer 36. The photoelectron beam has therefore the pattern of the original supersonic image. The photoelectron beam enters the guide 5 and remains focused by said guide. It may be also intensified if the guide has secondary electron emissive layer 20a or 20 or screen 22, as was described above. The intensified electron beam may be converted into a visible image as was explained above illustrated in FIGURE 1 or it may be converted into video signals as it was illustrated in FIGURE 13.

In another modification 68 shown in FIG. 13a the piezoelectric plate 35 is covered by a layer of a secondary electron emissive material 36 of one of materials described above for the layer 20 or 20a. The electron guide 5 in this modification has a hollow tunnel 37 through which the electron beam from the electron gun 40 may pass and impinge on layer 36 in a scanning pattern to produce a secondary electron emission from it. The deflecting means 53 will serve to produce a scanning motion of the electron beam. The high velocity electron beam from the electron gun 40 causes secondary electron emission from the layer 36. This elecron emission is modulated by the voltaic pattern in the plate 35. The secondary electrons enter the guide 5 and are intensified there by secondary electron emission, as it was described above and shown in FIG. 1e or FIG. 4. The multiplied electrons may be converted into video signals, as it is know in the television art.

It was found that the device 67 shown in FIG. 13c failed when a standard source of light was used. It was found that devices 67 or 69 could operate well only if the source 65 emitted only red or infrared light. In addition the source of light 65 should be preferably monochromatic or should emit in a narrow range of wavelengths. The use of standard source of light causes emission of photoelectrons ranging from 0.1 volt to 5 volts velocity. It was found that such range of photoelectrons could not be modulated with piezoelectric voltages on the plate 35.

The piezoelectric layer 35 may be of a continous type or of a discontinous mosaic type in all devices described.

The supersonic image devices shown in FIG. 13a, 13b, and 13c may be further improved by combining the piezoelectric layer 35 with a member 70 which intensifies supersonic waves. The member 70 may be in the form of a thin layer of a semi-conducting material such as CdS or ZnO. Especially CdS of a thickness of a few microns exhibits strong amplification of supersonic waves. Addition of activators such as Cu either by diffusion of Cu into CdS or by evaporation of Cu with CdS increases this amplification effect further. The amplifying layer 70 should be plated with conducting layers 72 and 73 such as of indium or tin oxide which are connected to a source of electrical potential to provide a uniform field through said layer 70. The conducting layer 72 preferably should be light transparent. It was found that irradiation of layer 70 with light through the conducting layer 72 improves supersonic amplification. The supersonsic amplifying layer 70 is responsive to longitudinal and to transverse supersonic waves and responds to a very wide range of frequencies of supersonic waves. The intensified supersonic waves emitted by layer 70 impinge on the piezoelectric layer 35 through the conducting layer 73 and produce potential or charge pattern corresponding to the original supersonic image.

In a modification of my invention the supersonic amplifying layer 70 is made preferably in the form of a mosaic 71 formed by a plurality of islands of CdS, ZnO or other suitable material and is mounted on the piezoelectric plate 35 as shown in FIG. 13a. Such a mosaic may be produced by evaporating the amplifying material through a mask or a mesh screen on a piezoelectric plate 35 which is first coated with a conducting layer 73. After evaporation of the mosaic 71, electrically conducting layer 72 is evaporated to provide the second electrode.

The piezoelectric layer 35 may be a self-supporting layer, and may serve as a support for the other layers and may also form the endwall of the vacuum tube.

It was found that difficult bonding problems arise in bonding the piezoelectric layer 35 to the glass of the envelope of the vacuum tube to make it the endwall of the tube. The use of indium seal or of epoxy seal is not efficient when piezoeletcric plates of a large diameter have to be cemented, as it is required in some applications. It was found that the best solution is to use a vacuum tube envelope of a ceramic. The piezoelectric plates of a large diameter may be well joined to said ceramic envelope by brazing. In some cases the tube envelope of a metal is preferable and it was found that piezoelectric plate 35 of quartz could be well bonded with the metallic envelope. Another solution of this problem is to mount the piezoelectric layer 35 on the inside surface of the endwall of the vacuum tube.

In some cases the conducting layer 72 or 73 may be eliminated. This modification applies to all embodiments of my invention.

The piezoelectric layer 35 may be of a continuous type or of a mosaic type. It may be made of titanates, quartz, niobates or other piezoelectric materials. The layer 35 may have a high resistivity such as $10^{15}$ ohm-cm., or it may be of a semiconducting material, having resistance of $10^7$ ohm-cm. to $10^{11}$ ohm-cm. The titanates or niobates can be prepared in a semi-conductive form by doping them with suitable agents. The mosaic type of layer 35 may be constructed by assembling a plurality of small crystals or by evaporating a polycrystalline layer or by mechanically grooving a large crystal into many small units.

Supersonic waves can be conducted by the fiber bundle 27 described above. By using as a source of image forming radiation piezoelectric or magnetostrictive generators of supersonic waves and conducting said waves to the examined part, we may produce supersonic images. Piezoelectric generators may be in the form of oscillating crystals of quartz, titanium compounds, such as titanates, Rochelle salts and other similar materials. The supersonic waves may be directed to the examined part by supersonic lenses or preferably by means of the fiber bundle 27. The supersonic waves reflected or transmitted by the examined part may be directed to the supersonic image sensitive member by the same fiber bundle or preferably by an additional fiber bundle. The supersonic sensitive member may have the form of piezoelectric elements, such as were described above for the supersonic generator, but smaller in size. In another embodiment of invention, the supersonic image sensitive member is a vacuum tube provided with a piezoelectric continuous or mosaic electrode 35; said piezoelectric screen or electrode receives the supersonic image of the examined part and converts said image into an electrical pattern of potentials or charges which correspond to said supersonic image. Such a vacuum tube is provided with a source of electron beam, such as electron gun for irradiation of said piezoelectric screen or electrode. The electron beam scans said piezoelectric screen or target and is modulated by the electrical pattern present on said screen or electrode and the returning modulated electron beam is converted into electrical signals in the manner well known in the television art.

In some cases the photoemissive layer 34 or secondary electron emissive layer 36 may be mounted in a closed spacing to the piezoelectric layer 35 as a separate unit. In such case the layer 34 or 36 may have a perforated support such as member 43 described above. The support for the layer 36 should be preferably of conducting material but in some cases dielectric material may be also used. The unit 43-36 or the unit 43-34 may be in contact with the layer 35 or may be mounted at a very small distance from the layer 35 such as one or a few microns at most. The electrons emitted by the layer 34 or 36 will enter the novel guide 5 for their focusing and in some cases for their further intensification as was described above.

In another modification 69 of this invention the photoemissive layer 34 or secondary electron emissive layer 36 are mounted on the end-face of the electron guide 5. The electron guide 5 is mounted in a distance of one or a few microns from the target 35, as shown in FIGURE 13b.

My device will be useful for construction of a novel electron gun which will offer an improvement of resolution of the electron beam. It is well known in the art that it is difficult to produce an electron beam of a small diameter without use of strong electrical or electromagnetic fields. My electron guide 5 and its modifications will permit the producing of the electron beam as small as of ten microns diameter or less without focusing fields. This construction is shown in FIGURE 14. The electron beam emerging from the source of electrons 40 enters into a closely spaced guide 5 having the apertures 42 of the size of five to ten microns, or of any other size desired and which is mounted in the vacuum tube 1D.

The guide 5 has essentially the same construction as was described above and all modifications of the guide 5 apply for the use in the novel electron gun 62 construction. In case a scanning electron beam is wanted the deflecting members 53 will direct the electron beam sequentially into various apertures 42 of the guide 5 to produce a scanning pattern. The deflecting means may also be mounted after the guide 5 instead of in front of it and will deflect the electrons after they were transmitted through the guide 5. The electrons traveling through the tunnels 6 of the guide remain focused therein. As the electron beam emerges from the apertures on the exit side of the guide 5 or 5A it has the same spot size it had at its entrance into the guide. It should be understood that the guide 5A may have tapered tunnels as it was described above, which may be of convergent form, in which case the electron beam will be demagnified upon its exit. In other cases, the tunnels may be of divergent form in which case the electron beam will be magnified upon its exit. It should be understood that apertures 42 may have a bevelled shape or other shapes.

The problem of prevention of space charge development will be solved in the same way as was described above.

In order to obtain the best definition of the electron beam the electrons which travel through the tunnels 6 of the guide 5A must be prevented from striking the walls of said tunnels. This can be accomplished by providing the walls of said tunnels which face the lumen with a conducting or semi-conducting coating 7a. The conducting coating may be of aluminum or chromium. The semiconducting coating may be of tin oxide or of titanium oxide. The coating 7a may be connected to the perforated conducting member 43 or 7b which again may be connected to an outside source of a electrical potential. As all tunnels 6 are in contact with the member 43, walls of said tunnels will have a electrical potential which will repel electrons. In this modification the tunnels 6 should be normal to the electron beam and the apertures 42 symmetrical in shape.

In some cases, the second perforated member 43 is mounted on the opposite end of the guide 5 or 5A. In this construction the member 43a may be connected to the external source of potential to provide acceleration for electrons.

In addition my electron gun can bring about intensification of the electron beam produced by the electron gun 40 without increasing the noise of the electron beam, which is of the utmost importance for many devices. The intensification of the electron beam from source 40 such as standard electron or matrix gun may be accomplished by all constructions described above, for example by depositing a very thin secondary electron emissive layer 20a on the end-face of the guide 5A as was described above and illustrated in FIGURE 5. The electron emissive layer 20a is deposited on the end-face of the guide. On layer 20a is mounted electrically conducting layer 7 or 7a or 43 thin as to be transparent to electrons, and connected to a suitable source of potential. The layer 20a may be continuous, but preferably it should be discontinuous. In the discontinuous construction it may overlie the apertures 42 of tunnels 6 but be absent from the solid parts of the guide 5 except around the edges of apertures. In some cases the electrically conducting layer 7b which provides potential for the secondary electron emissive layer 20a is deposited not only over the apertures of the guide 5, but as a continuous layer 7 extending over the solid parts of the end-face of the guide and over the apertures of the guide as well. This construction will be important for prevention of the accumulation of the space charge which may be very detrimental for the operation of the novel electron gun 62.

If the secondary electron emissive layer 20a is used on the end-face of the guide 5, it is preferable to deposit first said layer 20a whether it be in the form of a continuous layer or in the form of a discontinuous layer on the end-face of the guide and then to mount the member 43 or 7, as shown in FIGURE 5 or FIGURE 14. In some cases the sequence of the layer 20a and of the member 43 may be reversed and the member 43 is the first one to be mounted on the end-face of the guide. It should be understood that in cases in which the fragility of this device is not very critical the layer 20a and the member 43 may be mounted as one unit spaced apart from the end-face of the guide 5 or 5A. They must be however very closely spaced in relation to said end-face so that the secondary electrons will enter the apertures 42 without causing loss of resolution.

Further intensification of the electron beam may be accomplished by using a few guides 5, 5A or 5D each of them being provided with a secondary electron emissive screen comprising layers 43 and 20a. All such guides are combined in one unit by mechanical means, chemical means, or by heating. In this way a cascade intensification will be obtained. It should be understood that all modifications of the guide 5 may be used for such a cascade or tandem construction.

An additional intensification of the electron beam from the electron gun may be accomplished by depositing the secondary electron emissive layer 20 on the inside walls of the tunnels 6a, as it was explained above. The electron beam from the electron gun in such case is directed into apertures of the guide not normally but at an angle, the size of which will depend on the spacing between the electron gun 40 and the size of apertures 42. The oblique entrance of the electron beam into tunnels 6a causes impingement of the electrons on walls of the tunnels 6 and produces thereby secondary electron emission from the layer 20. The materials for the layer 20 were described above. The layer 20 is deposited on the electrically conducting layer or semiconducting layer or resistive layer 7c as it was explained above, and which is connected to the source of electrical potential. The secondary electrons emitted from the layer 20 strike the next part of the wall of the tunnels 6a. In this way, the intensification process is repeated until the electrons emerge from the tunnels 6a. As the electrons emerge from the guide, the electron beam size remains limited to the size of the diameter of the aperture, but it is greatly intensified, without introduction of any additional noise.

It should be understood that my device will be useful for all sources of electron beams whether the electron beam is produced by a hot filament or by a cold emission or by a field emission. It should be understood therefore, that the definition "electron gun" used in this specification and in the claims embraces all such sources of the electron beam.

It should be also understood that all modifications of the electron guide 5 such as 5A, 5B, 5C or 5D described above may be used for the construction of the novel "electron gun."

It should be understood that this novel electron gun may be used for television camera tubes, for kinescopes, for black and white images or for color images, and for storage tubes. It should also be understood that my device will be useful for devices using a broad electron beam such as applied for "reading" in storage tubes or for electron mirror tubes.

My invention will be of great importance for construction of novel storage tubes such as having electron gun or a photocathode or both. The present storage tube has a very low resolution such as ½ pair lines per millimeter. I found that this low resolution is due to inability of the storage target in these tubes to focus the broad "reading" electron beam into a plurality of electron microbeams small enough to depict image points of a minute size such as it is necessary, e.g., for resolution of 10 pair lines per millimeter.

This problem was solved in my device in which the broad electron beam is split into plurality of small electron beams by the novel electron guide. The split electron beam can be as small as 10 microns in diameter and will give the final image of a high resolution which was not possible before.

In conclusion my invention allows the separation of the two functions which were before provided by the storage target of the prior art, such as modulation of the broad electron beam with a stored charge pattern and focusing of said beam.

In this embodiment of invention, shown in FIGURE 15, the electron guide 5B in the vacuum tube 1E has the electrically conducting member 43 or 7b of aluminum or nickel such as was described above, deposited on the end-face of the guide 5B. Next the secondary electron emissive layer 52 of dielectric material such as alkali halides or MgO or $Al_2O_3$ is deposited on said conducting member 43.

The sequence of the layer 52 and of the member 43 may be reversed in some cases and the layer 52 is deposited on the end-face of the guide 5B first.

The member 43 and layer 52 are deposited on the solid parts 44 of the end-face of the guide 5B in such a manner as not to obstruct the apertures 42.

In operation of this storage device, the photoelectrons from the photocathode 2 or from another source of electron beam which is image modulated such as an electron gun 40 are directed to the end-face of the guide 5B and impinge on the secondary electron emissive layer 52 producing a positive or negative charge image on the end-face of said guide according to the potentials used. The charge image cannot leak away because it is formed on a dielectric layer 52 as shown in FIGURE 15. As a result a stored charge image remains on the end-face of the guide 5B and has the pattern of the original electron image. Next a broad nonmodulated electron beam is produced either by irradiation of the photocathode 2 with a uniform source of red or infrared light, or by using an electron gun 40 for this purpose. The broad electron beam as it enters the apertures 42 of the guide 5B will be modulated by the stored charge image, and will have, therefore, imprinted on it the pattern of the original image. The broad electron beam is decelerated before the endface of the guide by a mesh screen or by conducting rings connected to a suitable source of electrical potential. The broad electron beams after being split into plurality of microbeams by the electron guide 5B is directed onto image reproducing screen and reproduces a visible image. Instead of a luminescent screen 8 other types of screens such as scotophore screens, targets, such as dielectric tape, or photoconductive or semiconductive targets may be used as well.

It should be understood that the storage unit 43–52 may be mounted in apposition or in a close spacing to the end-face of the guide 5B as a separate unit.

It should be understood that the electron guide 5B used in this embodiment of the invention may be made by any method and may be of any type described in this specification. It should be understood therefore that "reading" electron beam may be intensified by secondary electron multiplication and by cascade use of plurality of electron guides.

In some cases, instead of a storage material 52 of a dielectric type, a semiconducting material or even a conducting material such as Be, Cu, or Ni may be used. Such conducting storage layer must be deposited as a discontinuous mosaic on the dielectric solid parts 44 of the end-face of the guide 5B and will be able to store the charge pattern because of its dielectric base.

It should be understood that the electron storage-guide unit may be also used in any type of vacuum tubes such as camera television tubes, kinescopes etc. and my invention is not limited to the image type of tube 1E.

It should be understood that all vacuum tubes described above may be operated in a continuous manner, or in a pulsed manner. In the pulsed operation the potential for the acceleration of electrons from the photocathode 2 or electron gun 40 is suspended for a short duration. This time interval may be also used for providing a suitable positive or negative potential to the conducting or semiconducting coating on the inside walls of tunnels 6 in order to eliminate positive or negative space charge accumulations. The positive potential may be applied to the end-face of the guides 5 to dissipate the negative charges present thereon, or a negative potential may be applied to dissipate positive charges present thereon. It will depend on the type of the vacuum tube and on its operational voltages whether we will have positive or negative space charge.

It should be understood that all types of the electron guide may be used in each embodiment or modification of my invention.

It should be understood that the word "glass" in claims embraces all kind of glasses and of plastic materials as well.

It should be understood that the word "light" in claims embraces all visible and invisible radiations.

It should be understood that word "tunnels" in this specification and in the appended claims means passages which have walls completely surrounding said passages leaving only the end-faces open. It is in contradistinction to "channels" which are not surrounded by walls on all sides.

As various possible embodiments might be made of the above invention, and as various changes might be made in the embodiment above set forth, it is to be understood that all matter herein set forth or shown in the accompanying drawings is to be interpreted as illustrative and not in a limiting sense.

What I claim is:

1. A vacuum tube comprising in combination means for receiving a radiation image and converting said radiation image into a beam of electrons having the pattern of said image and a device for multiplying said electrons, said device comprising a plurality of separate elongated members, each of said members having its own individual walls and comprising a hollow tunnel surrounded by said walls, said walls having tubular configuration and being continuous throughout their entire length and their circumference, each of said tunnels having an aperture for the entrance of said electrons, said entering electrons striking the inside surface of said tunnels and producing multiplied secondary electrons, and an aperture for the exit of said secondary electrons, said tunnels having the length larger than the diameter of said tunnels, said tubular walls of said members furthermore constituted of leach-resistant glass and having an inner surface of secondary electron emissive material, said tubular walls formed by leaching out an inner core of said members constituted of a leachable glass, said members being bonded together in one unit by fusing the walls of one of said members directly to the walls of the adjacent member, said device comprising furthermore electrically conducting means mounted in cooperative relationship with said apertures for providing electrical potential to said members, said tube comprising furthermore means for receiving and utilizing said electrons after their exit from said apertures.

2. A vacuum tube as defined in claim 1 which comprises an endwall provided with fiber-optic means having a plurality of members conducting light by internal reflection of said light in said members, said members having core of material of high index of refraction and coating means of a lower index of refraction than said core.

3. A vacuum tube as defined in claim 2 which is mounted in combination with another vacuum tube provided with an endwall having fiber-optic means comprising a plurality of members conducting light by internal reflection of said light, said both vacuum tubes mounted in cooperative relationship to each other.

4. A vacuum tube as defined in claim 1 in which said means converting said radiation image into a beam of electrons comprise photoemissive means, said photoemissive means including plurality of different alkali metals in combination with antimony, and which comprises luminescent means for receiving said exited electrons, said luminescent means provided with an electron transmitting light reflecting layer, said layer preventing the back-scatter of light emitted by said luminescent means.

5. A vacuum tube as defined in claim 1 which comprises a composite screen having luminescent means and photoelectric means.

6. A vacuum tube as defined in claim 1 which comprises means reactive to X-rays and emitting electrons in response to X-rays, said means mounted outside of said tunnels and comprising photoemissive means, said photoemissive means including plurality of different alkali metals in combination with antimony.

7. A vacuum tube as defined in claim 1 which comprises means reactive to X-rays and emitting electrons in response to said X-rays, and which comprise luminescent means provided with an electron transmitting light reflecting layer, said layer preventing the back-scatter of light emitted by said luminescent means.

8. A vacuum tube as defined in claim 1 in which said members are bonded together by heat fusion of their walls to each other and in which said walls are of material resistant to deformity by said heat fusion and preserving the uniformity of the diameter of said tunnels.

9. A device for multiplying electrons, said device comprising a plurality of separate elongated members, each of said members having its own individual walls and comprising a hollow tunnel surrounded by said walls, said walls having tubular configuration and being continuous throughout the entire length and their circumference, each of said tunnels having an aperture for the entrance of said electrons, said entering electrons striking the inside surface of said tunnels and producing multiplied secondary electrons, and an aperture for the exit of said secondary electrons, essentially each of said tunnels having the length larger than the diameter of said tunnels, said tubular walls of said members furthermore constituted of a leach-resistant material and having an inner surface of secondary electron emissive material, said tubular walls formed by leaching out an inner core of said members constituted of a leachable glass, said members being bonded together in one unit by fusing the walls of one of said members directly to the wall of the adjacent member, said device comprising furthermore electrically conducting means mounted in cooperative relationship with said apertures for providing electrical potential to said members.

10. A device as defined in claim 9 in which said material of said walls is glass.

11. A vacuum tube comprising in combination means for receiving a radiation image and converting said radiation image into a beam of electrons having the pattern of said image and a device for multiplying said electrons, said device comprising a plurality of separate elongated members, each of said members having its own individual walls and comprising a hollow tunnel surrounded by said walls, said walls having tubular configuration and being continuous throughout the entire length and their circumference, each of said tunnels having an aperturn for the entrance of said electrons, said entering electrons striking the inside surface of said tunnels and producing multiplied secondary electrons, and an aperture for the exit of said secondary electrons, essentially each of said tunnels having the length larger than the diameter of said tunnels, said members being bonded together in one array by heat fusion of walls of one of said members directly to the walls of adjacent member, said tubular walls constituted of material resistant to deformity by said heat fusion and preserving the uniformity of the diameter of said tunnels, said device comprising further more electrically conducting means mounted in cooperative relationship with said tunnels for providing electrical potential to said members, said tube comprising furthermore means for receiving and utilizing said electrons after their exit from said apertures.

12. A vacuum tube as defined in claim 11 which comprises an endwall provided with fiber-optic means comprising a plurality of members conducting light by internal reflection of said light in said members said members having core of material of a high index of refraction and coating means of a lower index of refraction than said core.

13. A vacuum tube as defined in claim 12 which is mounted in combination with another vacuum tube provided with an end-wall having fiber-optic means comprising a plurality of members conducting light by internal reflection of said light, said both vacuum tubes mounted in cooperative relationship to each other.

14. A vacuum tube as defined in claim 11 in which said means converting said radiation image into a beam of electrons comprise photoemissive means, said photoemissive means including plurality of different alkali metals in combination with antimony and which comprises luminescent means for receiving said exited electrons, said luminescent means provided with an electron transmitting light reflecting layer, said layer preventing the back-scatter of light emitted by said luminescent means.

15. A vacuum tube as defined in claim 11 which comprises a composite screen having luminescent means and photoelectric means.

16. A vacuum tube as defined in claim 11 which comprises means reactive to X-rays and emitting electrons in response to said X-rays said means mounted outside of said tunnels and comprising photoemissive means, said photoemissive means including plurality of different alkali metals in combination with antimony.

17. A vacuum tube as defined in claim 11 which comprises means reactive to X-rays and emitting electrons in response to said X-rays, and which comprise luminescent means provided with and electron transmitting light reflecting layer, said layer preventing the back-scatter of light emitted by said luminescent means.

18. A device for multiplying electrons, said device comprising a plurality of separate elongated members, each of said members having its own individual walls and comprising a hollow tunnel surrounded by said walls, said walls having tubular configuration and being continuous throughout the entire length and their circumference, each of said tunnels having an aperture for the entrance of said electrons, said entering electrons striking the inside surface of said tunnels and producing multiplied secondary electrons, and an aperture for the exit of said secondary electrons, essentially each of said tunnels having the length larger than the diameter of said tunnels, said members being bonded together in one array by heat fusion of walls of one of said members directly to the walls of adjacent member, said tubular walls constituted of material resistant to deformity by said heat fusion and preserving the uniformity of the diameter of said tunnels, said device comprising furthermore electrically conducting means mounted in cooperative relationship with said tunnels for providing electrical potential to said members.

References Cited

UNITED STATES PATENTS

| | | | |
|---|---|---|---|
| 2,198,479 | 4/1940 | Langmuir | 313—65 |
| 2,802,963 | 8/1957 | Sheldon | 313—65 |
| 2,821,637 | 1/1958 | Roberts et al. | 313—68 X |
| 3,128,408 | 4/1964 | Goodrich et al. | 313—68 |
| 3,260,876 | 7/1966 | Manley et al. | 313—68 |

DAVID J. GALVIN, *Primary Examiner.*

V. LAFRANCHI, *Assistant Examiner.*